Dec. 12, 1967   R. E. JEANFAVRE   3,357,619
DRIVING APPARATUS

Filed Dec. 20, 1965   3 Sheets-Sheet 1

INVENTOR.
ROGER JEANFAVRE
BY
*Ward, Haselton, McEllenny, Orne, Brooker & Fitzpatrick*
ATTORNEYS

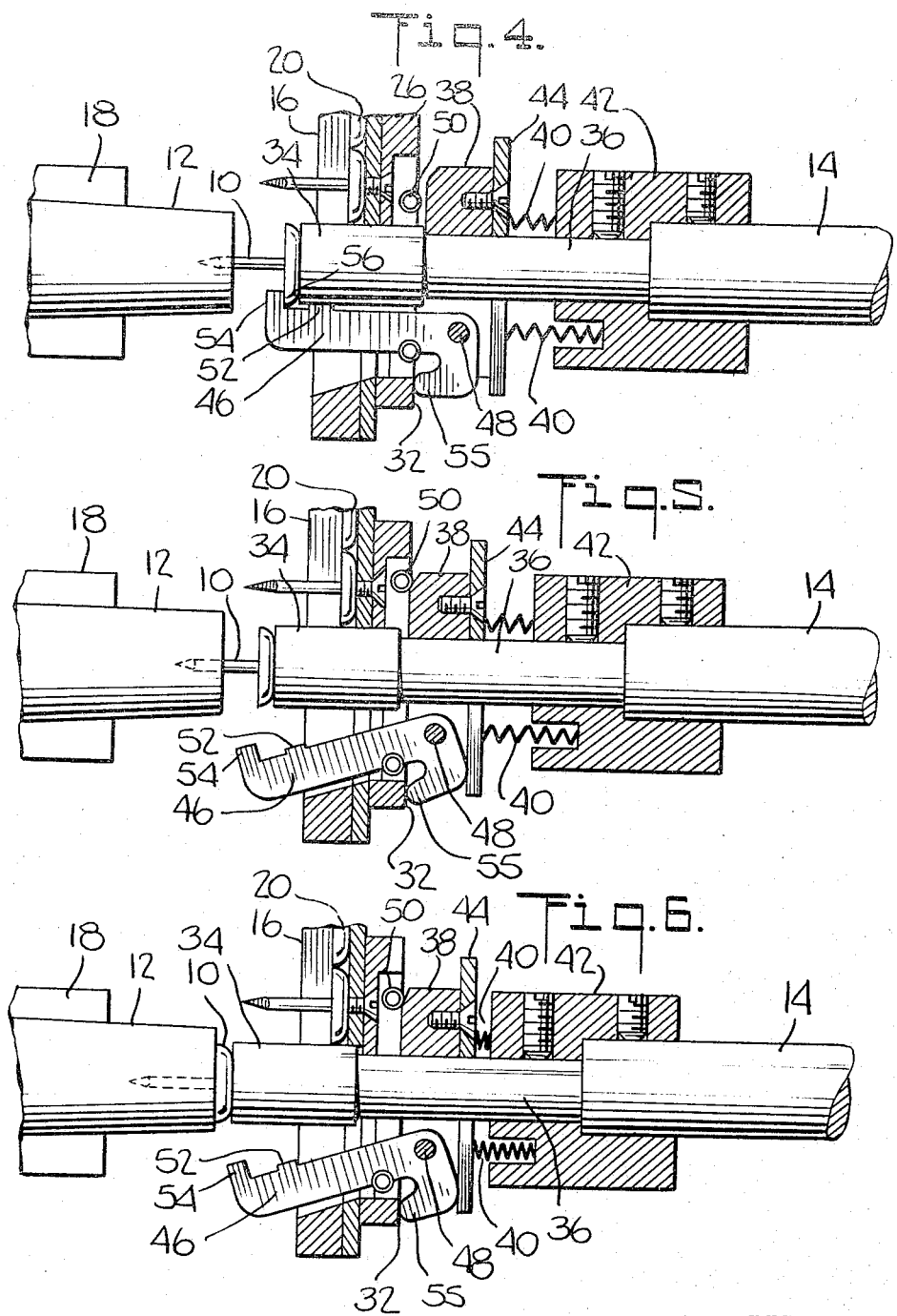

Dec. 12, 1967 R. E. JEANFAVRE 3,357,619
DRIVING APPARATUS
Filed Dec. 20, 1965 3 Sheets-Sheet 3
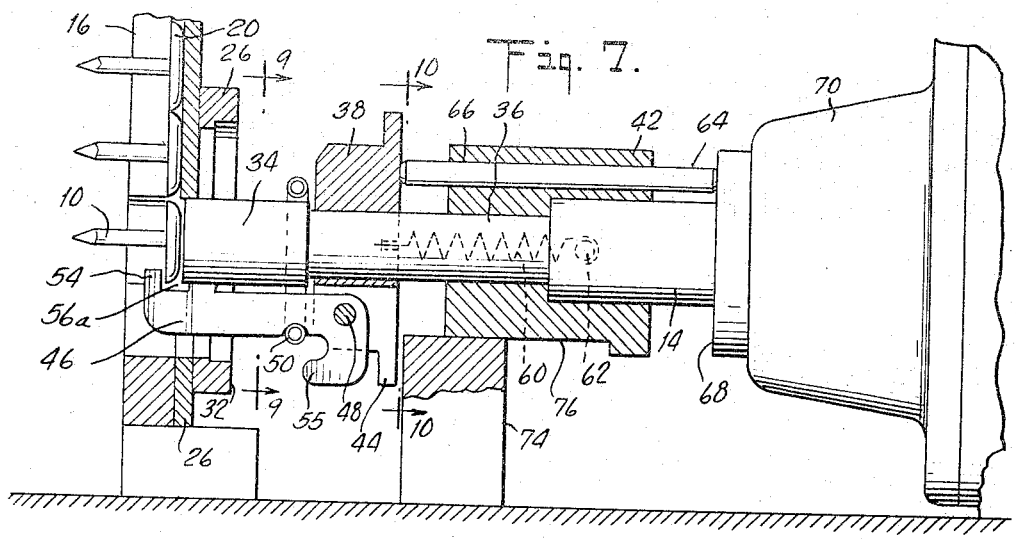
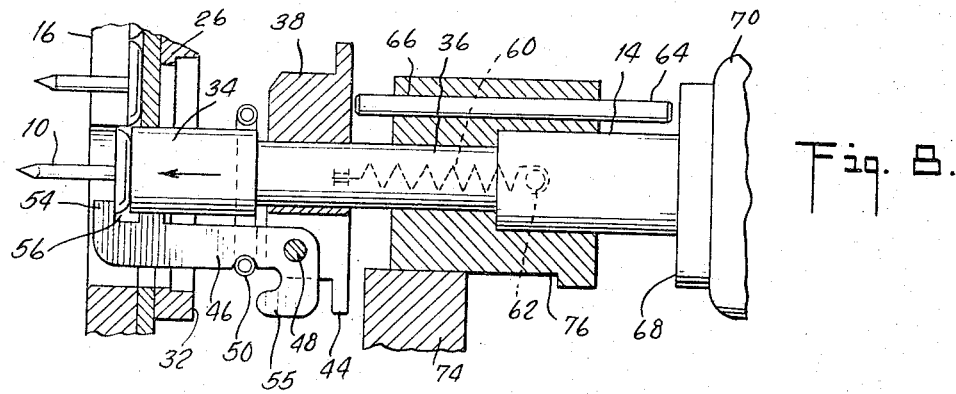
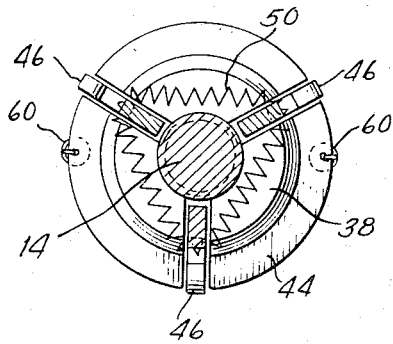
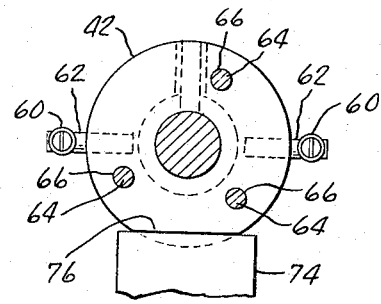
INVENTOR.
ROGER JEANFAVRE
BY
Ward, Haselton, McElhannon, Orme, Brooks&Fitzpatrick
ATTORNEYS

# United States Patent Office 3,357,619
Patented Dec. 12, 1967

3,357,619
DRIVING APPARATUS
Roger E. Jeanfavre, Litchfield County, Conn., assignor to The Turner & Seymour Mfg. Co., Torrington, Conn., a corporation of Connecticut
Filed Dec. 20, 1965, Ser. No. 517,506
10 Claims. (Cl. 227—149)

ABSTRACT OF THE DISCLOSURE

Mechanism for driving fittings including a plunger and gripper means associated with the plunger for grasping the head of a fitting and holding it to the end of the plunger, and an associated gripper release mechanism comprising a stop member which is engaed by projections to actuate the gripper members of a released position when the plunger member moves towards a forwardmost or projected position.

---

This is a continuation-in-part of a copending application entitled Driving Apparatus filed August 5, 1964, Serial No. 387,812, now abandoned.

This invention relates to driving devices and more particularly it concerns an improved mechanism for forcing nail-like fittings into wood or similar materials.

Driving devices of the type to which the present invention is related operate by guiding a nail or fitting to a position between a reciprocally movable plunger and a wooden or similar element into which the fitting is to be driven. As the plunger moves forward toward the wooden element, it engages the head of the fitting and drives the fitting into the element. Usually a plurality of gripper elements are provided to hold the head of the fitting flat against the plunger end so that it is held in properly aligned position for this driving operation.

A major drawback of these conventional driving devices is their inability to drive fittings with consistent accuracy. Very often the fitting becomes tilted so that it is not driven in proper alignment; or, if the tilt becomes too great, it will not be driven at all. In addition to the lack of reliability which this creates, the situation is further aggravated by the fact that the wooden element into which the fitting is to be driven is often severely marred or even ruined by the tilted fitting.

It has been discovered that the above described difficulties are attributable primarily to the gripper elements which hold the head of the fitting against the end of the plunger. These gripper elements are pivotally mounted in the vicinity of the plunger end at its retracted position. They are formed with fingers or lug type protrusions which extend around the head of the fitting so as to hold it against the end of the plunger. As the plunger protracts or moves to drive the fitting toward the wooden element being nailed, the gripper elements immediately begin to pivot away from the fitting. As a result, the fitting is often released before it becomes sufficiently imbedded into the wooden element to maintain its alignment. Consequently the fitting is either forced into the element in a improperly aligned position or is not forced into the element at all. In either case, the chances of damage to or marring of the element and fitting are greatly increased.

Accordingly to the present invention, the above described difficulties are overcome by providing in a driving apparatus, gripper means which maintain proper alignment of the fitting being driven until the fitting has become sufficiently imbedded into the wooden element to maintain its own alignment. This is accomplished by providing a carrier element mounted on the driving plunger itself to be carried along with the plunger. This carrier element has gripper elements pivotally mounted thereon. These gripper elements have finger portions biased to fit around the head of a fitting and hold it flat against the head of the plunger. Because the gripper elements are carried along with the plunger, they do not immediately open as the plunger begins to move. A retraction plate is positioned ahead of the carrier and becomes intercepted by protruding elements on the gripper elements as the plunger continues to move forward. However, by this time the shank of the fitting is driven sufficiently into the wooden element to maintain its own proper alignment.

As shown in the illustrative embodiments there are provided resilient mounting means connecting the carrier element to the driving plunger. This permits the carrier element to be moved along by the plunger but also allows limited relative longitudinal movement between the two under certain conditions to be described.

In one embodiment forward stop means are provided to limit the forward motion of the carrier element and the opening motion of the gripper elements to a position corresponding to their release of a partially driven fitting. The resilient mounting means however permits the driving plunger to complete its forward driving movement even though the carrier element has stopped moving.

In the second embodiment, rearward stop means are provided to limit the rearward movement of the carrier element to a position slightly in advance of the fully retracted position of the driving plunger. This permits the plunger tip to be moved back from the hooking edges of the gripper elements, thus leaving a relative large space into which the head of a fitting can be accommodated. This permits fittings to be fed easily and rapidly, as through a chute into position in front of the driving plunger. Thereafter, as the plunger moves forward, the resilient mounting means urges the carrier element rearwardly so that the fitting becomes held tightly against the plunger tip by the gripper elements.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIGS. 4–6 are views similar to FIG. 1 but illustrating the relative positions of the various elements of the device in a driving operation;

FIG. 7 is a side elevational view partially in section, of a modified version of a driving apparatus according to the present invention, in fully retracted condition;

FIG. 8 is a view similar to FIG. 7 showing the apparatus during driving;

FIG. 9 is a section view taken along line 9—9 of FIG. 7; and

FIG. 10 is a section view taken along line 10—10 of FIG. 7.

Figure 1:
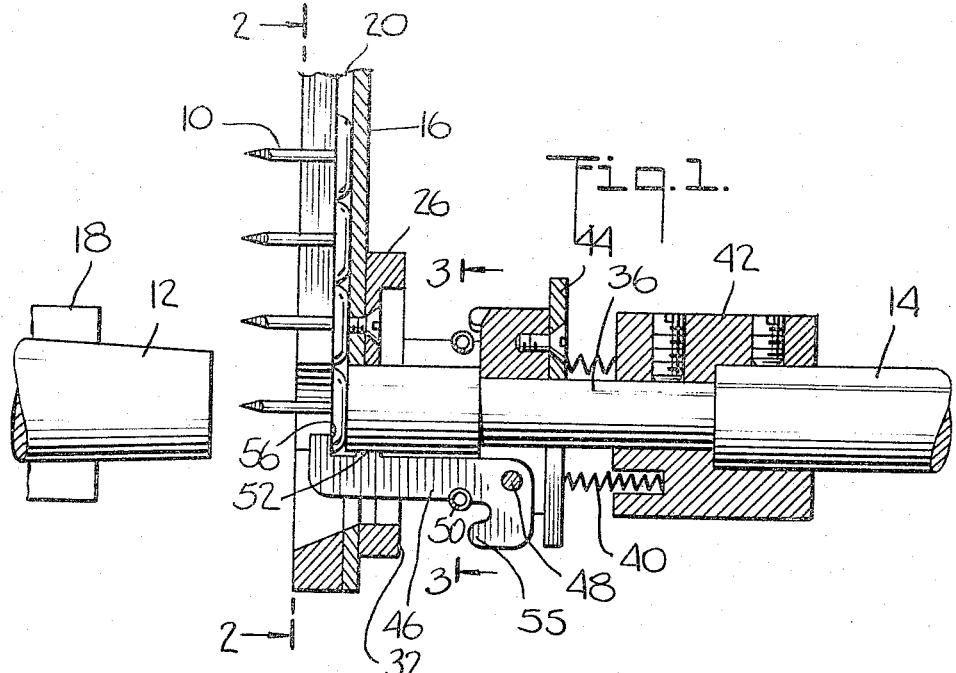
FIG. 1 is a side elevational view, partially in section, of a driving apparatus embodying the present invention and having its plunger or driving punch in retracted position.

The driving apparatus illustrated in FIG. 1 is designed to force fittings such as glide elements 10 into the ends of wooden furniture legs 12.

The apparatus includes a driving punch 14 which moves reciprocally in a horizontal direction under the influence of a hydraulic, pneumatic or other conventional power source (not shown). The slide elements 10 are individually guided by means of an upwardly extending feed chute 16 into the path of reciprocal movement of the driving punch 14 whereupon they become driven by the punch into a wooden leg 12. A clamping fixture 18 holds the leg 12 in proper alignment with respect to the punch 14.

Figure 2:
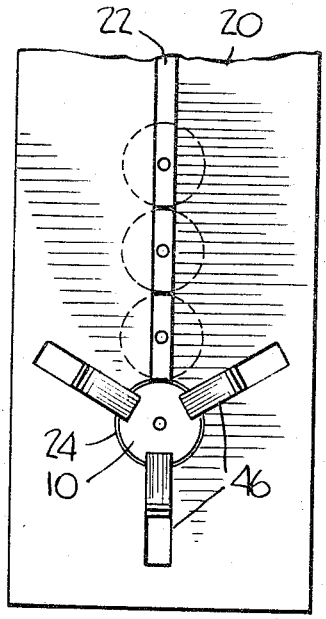
FIG. 2 is a view taken along line 2—2 of FIG. 1.

The feed chute 16 is mounted at a fixed distance from the clamping fixture 18 so as to position each glide element 10 such that its point becomes located immediately adjacent to the bottom of the wooden leg 12 and in proper alignment therewith for accurate driving. As shown in FIG. 2, the feed chute 16 is provided with an enlarged inner passageway 20, which accommodates the heads of the glide elements 10, and a narrow slot-like opening 22 through which the shanks of the glides protrude. A hole 24 extends through the lower portion of the chute and is located and sized so as to permit the driving punch to force the lowermost glide out of the chute and into the end of the leg 12.

A circular retraction plate 26 is mounted on the rear of the glide feed chute 16 concentric with the hole 24. This retraction plate has a central opening 30 through which the driving punch 14 moves. The retraction plate 26 is also provided with a stop surface 32 which, as will be explained more fully hereinafter, acts to release the individual glides after they have become driven a prescribed amount into the wooden legs 12.

The driving punch 14 is formed with a head portion 34, the end of which engages the individual glides, and a smaller diameter intermediate portion 36. An annularly shaped carrier 38 is formed to be guided by and to move reciprocally on the smaller diameter intermediate portion 36 of the driving punch 14. The carrier is urged up against the enlarged head portion 34 by means of compression springs 40 which extend between the carrier 38 and a connector block 42 bolted to the driving punch 14. The carrier 38 has attached thereto an enlarged disk shaped stop plate 44 which, as will become apparent, acts to limit the movements of the gripper elements.

Figure 3:
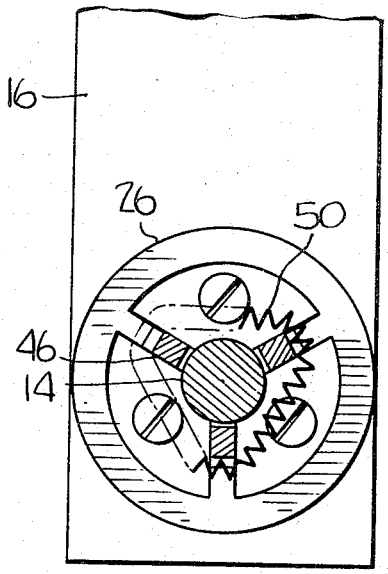
FIG. 3 is a view taken along line 3—3 of FIG. 1.

Three gripper elements 46 are distributed about the carrier 38 and are attached thereto by means of pivots 48 for movement in planes radial to the longitudinal axis of the driving punch 14. A coiled garter spring 50 (FIG. 3) extends around the three gripper elements 46 and biases them toward a normally closed or gripping position such as that shown in FIG. 1. The gripper elements are each provided with an alignment boss 52 which abuts against the head portion 34 of the driving punch and defines the closed position of the gripper elements.

The extremities of the gripper elements 46 are formed with fingers 54 which, in the closed position of the gripper elements, extend radially over the end of the head portion 34 of the driving punch 14. These fingers are located a slight distance from the end of the driving punch so as to form slots 56 into which the head of each individual glide element 10 fits. It will be seen that when the gripper elements are in their closed position as shown, the glide elements are held flat against the head of the driving punch 14 by means of the fingers 54. The opposite ends of the gripper elements are also provided with protruding elements 55 which are located to be engaged by the stop surface 32 of the retraction plate 26 when the carrier has moved a certain distance forward.

The successive steps in the sequence of operation of the above described device are illustrated in FIGS. 1 and 4–6. As shown in FIG. 1, the individual glide elements 10 are guided downwardly through the feed chute 16 so that the head of the lowermost glide drops into the slots 56 formed between the head portion 34 of the driving punch 14 and the fingers 54 of the gripper elements 46. The glide element is thus held with its head flat against the end of the driving punch. In this position, the glide element is aligned with the wooden furniture leg 12 and is in a position to be driven by the punch 14 through the opening 24 in the feed chute 16 and into the wooden leg 12.

Initial forward movement of the driving punch 14, as shown in FIG. 4, causes the glide element 10 to be driven toward the wooden leg 12 so that its point enters the leg. During this initial driving however, the gripper elements 46 remain in their aforesaid closed position so that the head of the glide element is held against the driving punch and its shank is maintained in proper alignment with respect to the leg 12. This prolonged gripping is made possible by the fact that the carrier 38 and gripper elements 46 are caused to move along with the driving punch 14 as an integral unit therewith.

As the driving punch 14 continues to move toward the wooden leg 12 and the shank of the glide element 10 becomes more deeply embedded therein, the need for maintaining alignment by means of fingers 54 diminishes and the gripper elements may swing away so as to remove the fingers 54 from under the head of the glide element 10. This is accomplished by the protruding elements 55 on the gripper elements 46 engaging the stop surface 32 of the retraction plate 26. As the driving punch 14 continues its forward movement, the retraction plate 26 causes the gripper elements to rotate about their pivots 48 so that the fingers 54 are pulled away from the head of the glide element 10. When the gripper elements have swung a sufficient distance to release the glide element 10, further movement is impeded by means of the stop plate 44 as shown in FIG. 5.

After release of the glide element 10, it is driven further into the wooden leg 12 by continued forward movement of the driving punch 14. During this last stage of driving the carrier 38 is restricted from further forward motion by means of the retraction plate 26 acting against the protruding elements 55 of the gripper elements 46. However, as shown in FIG. 6, the driving punch 14 is enabled to continue its forward motion for the carrier is movably mounted on the intermediate portion 36 of the driving punch; and it simply slides back on the punch compressing the springs 40 on the punch. It will, of course, be understood that the compression springs 40 must be stiffer than the garter spring 50 so that release of the gripper elements is effected prior to rearward movement of the carrier 38 on the driving punch 14.

It will be appreciated from the above description that the driving apparatus of the present invention, while simple in structure and in operation, does permit the automatic driving of fittings in a very accurate and reliable manner upon simple reciprocal movement of a driving punch. This has been made possible by mounting gripper elements on a carrier which moves along with the driving punch and by further providing a retraction plate which engages the gripper elements to release them only after the driving punch has moved a prescribed distance.

The embodiment shown in FIGS. 7–10 is similar to that previously described, but it has the additional advantage that it permits of a larger opening 56a between the end of the head portion 34 of the driving punch 14 and the gripper fingers 54 when the driving punch is in its fully retracted position. This larger opening, as shown in FIG. 7, permits the glide elements 10 to flow more easily from the feed chute 16 into position in front of the punch 14. Accordingly there is less tendency toward jamming of the glide elements; and the dimensional tolerances in the vicinity of the feed chute 16, the driving punch 14, the carrier 38 and the gripper elements 46 can be less stringent.

As shown in FIG. 7, the overall configuration of the feed chute 16, the carrier 38 and gripper elements 46 and the driving punch 14 is the same as in the preceding embodiment. In this embodiment however, the carrier 38 is connected by means of a pair of tension springs 60 to the connector block 42. The spring connections to the carrier 38, as shown in FIG. 9, are made by hooking the forward end of the spring over the carrier stop plate 44. The rearward ends of the springs 60 are looped over a pair of dowels 62 which extend laterally outward from the sides of the connector block 42.

A plurality of elongated stop pins 64 extend through and are slideable longitudinally in bores 66 in the connector block 42. These stop pins at one end abut against the facing 68 of a fixed driving punch casing 70. The other ends of the pins 64 abut against the back of the carrier stop plate 44; and thus limit the movement of the carrier 38 in its rearward or retraction direction. The length of the stop pins 64 is chosen such that the rearward movement of the carrier 38 is halted at a location slightly ahead of the fully retracted position of the driving punch 14. The slight additional rearward movement of the driving punch 14 extends the tension springs 60.

Because the carrier 38 is limited in its rearward movement by the stop pins 64, so also is the rearward movement of the gripper elements 46 and their fingers 54. Thus, the continued rearward movement of the driving punch 14 after stoppage of the gripper fingers 54 operates to produce a large opening 56a which better accommodates the head of a glide element 10. This condition is illustrated in FIG. 7.

Upon driving, or protraction, of the driving punch 14, the tension springs 60 hold the gripper fingers 54 in position until the tip of the punch abuts against the head of the glide element 10 and holds it firmly against the gripper fingers. As the driving punch continues to drive forward, the carrier 38 and gripper elements 46 are carried along with it, the tension springs 60 holding the gripper fingers 54 back against the glide element 10 with just enough force to keep it in proper alignment against the end of the driving punch. This condition of the device is illuminated in FIG. 8.

It will be noted that with this arrangement the carrier 38 is carried along by the driving punch 14; and that in spite of the fact that the gripper fingers 54 are resiliently biased up against the driving punch 14, no variation in this resilient force occurs during the driving operation. Moreover, no spring flexing whatever takes place during the driving operation. Thus driving control can be maintained and vibrations reduced during high speed operation. Finally, this arrangement permits minimum force to be used in holding the gripper fingers back against the glide element 10 at the point where the gripper fingers are slid off from the head of the glide element. In prior arrangements, where maximum force is imposed at this point, the sliding of the gripper fingers tends to mar the surface of the glide element.

When the glide element 10 has been partially driven and the protruding elements 55 of the gripper elements abut against the stop plate 44, the continued forward movement of the driving punch 14 operates to open the gripper elements as described previously.

In order to ensure proper alignment of the driving punch during operation, there is provided a fixed guide block 74 just under the connector block 42. The connector block 42 is formed with a flattened region 76, as illustrated in FIG. 10 and this flattened region rests and slides along on top of the guide block 74. The flattened region 76 also serves to prevent any rotation of the connector block 42, and therefore of the driving punch 14 during operation.

Having thus described my invention with particular reference to the preferred forms thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. Apparatus for driving fittings comprising a driving plunger arranged for reciprocal movement in a forward direction to a first, fully protracted, position and in a rearward direction to a second, fully retracted, position, gripping means mounted exclusively on and carried along by said driving plunger, said gripping means including a carrier element resiliently connected to said driving plunger for limited movement therealong, gripper elements mounted on said carrier element and movable laterally thereon between a closed position extending over the tip of the plunger and an open position laterally displaced from said plunger, said gripper elements having associated therewith gripper element actuating means including actuator protrusions carried along on said carrier element, and a fixed stop member positioned in the path of longitudinal movement of said actuator protrusions for intercepting their forward movement, the relative movement thus produced between said carrier element and said actuator protrusions serving to move said gripper elements to their opened position.

2. Apparatus as in claim 1 wherein said gripping means further includes abutment means for limiting the relative movement of said actuator protrusions and said gripper elements with respect to said carrier element.

3. Apparatus as in claim 1 wherein said gripper elements are pivotally mounted on said carrier element for movement in planes radial to the longitudinal axis of said driving plunger and are resiliently biased toward their said gripping position whereby said gripper elements move to their closed position upon rearward movement of said actuator protrusions back from said fixed stop member.

4. Apparatus as in claim 1 wherein there is further provided stop means limiting the rearward movement of said carrier element to a second position in advance of that corresponding to said second position of said driving plunger means.

5. Apparatus as in claim 4 wherein said gripper elements are arranged to be in their closed position upon retraction of said driving plunger to define a widened region for accommodating a fitting as said plunger means moves rearwardly to its fully retracted position.

6. Apparatus as in claim 5 and further including a fitting feed chute opening into said widened region.

7. Apparatus for driving fittings into wooden elements or the like, said apparatus comprising plunger means operative to move reciprocally along a given axis between a retracted and a protracted positions, means for holding an element to receive a fitting in the path of movement of said plunger means, guide means for guiding a fitting into alignment with said axis between said plunger means and an element held by said holding means when said plunger means is in its said retracted position, said plunger means including a carrier attached thereto and movable reciprocally therewith, a plurality of gripper elements pivotally attached to said carrier about its periphery to swing thereon in planes radial to said axis, abutment means associated with said plunger means for limiting the swinging movement of said gripper elements at closed and opened positions respectively, said gripper elements being provided with finger elements operative in the closed position to hold a fitting in alignment against the head of said driving plunger means, and operative to release said fitting when said gripper elements move toward their opened position, said gripper elements further being provided with protruding portions which extend radially outward from said carrier when said gripper elements are in their said close position, resilient biasing means operative to bias said gripper elements toward their said closed position and a retraction plate having stop surfaces which lie at a fixed point in the path of forward movement of said protruding portions to cause swinging of said gripper elements and release of said fitting after said plunger means has moved a prescribed distance toward its protracted position.

8. Appartus as in claim 7 wherein said abutment means includes a stop plate attached to said carrier and located to intercept said gripper elements to restrict radial swinging thereof to an amount sufficient to release a fitting upon continued movement of said plunger means.

9. Apparatus as in claim 8 wherein said carrier element is mounted on said plunger means in a manner allowing continued movement of said plunger means upon the force imposed by said retraction plate upon said carrier exceeding that required to overcome the force of said resilient biasing means.

10. Apparatus as in claim 8 wherein said carrier element is axially movable relative to said plunger means and connected thereto by means of further resilient means biasing said carrier to a protracted position on said plunger means, said further resilient means being of sufficient rigidity to hold said carrier fixed with respect to said plunger means during opening of said gripper elements.

References Cited

UNITED STATES PATENTS

| | | | |
|---|---|---|---|
| 626,687 | 6/1899 | Goldberg | 227—149 |
| 626,699 | 6/1899 | Heineman | 227—149 |
| 688,026 | 12/1901 | Marks | 227—149 |
| 1,355,363 | 10/1920 | Shaw | 227—15 |
| 2,172,446 | 9/1939 | Marsack et al. | 227—115 X |
| 3,117,690 | 1/1964 | Anderson | 227—115 |

GRANVILLE Y. CUSTER, JR., *Primary Examiner.*